US012680979B2

(12) United States Patent
Ouyang et al.

(10) Patent No.: US 12,680,979 B2
(45) Date of Patent: Jul. 14, 2026

(54) EDDY CURRENT PROBE ASSEMBLY

(71) Applicant: RTX Corporation, Farmington, CT (US)

(72) Inventors: Zhong Ouyang, Glastonbury, CT (US); Kim B. Harmon, Bolton, CT (US); Nigel D. Sawyers-Abbott, South Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 159 days.

(21) Appl. No.: 18/379,989

(22) Filed: Oct. 13, 2023

(65) Prior Publication Data

US 2025/0123241 A1 Apr. 17, 2025

(51) Int. Cl.
G01N 27/90 (2021.01)

(52) U.S. Cl.
CPC .................................. G01N 27/9006 (2013.01)

(58) Field of Classification Search
None
See application file for complete search history.

(56) References Cited

U.S. PATENT DOCUMENTS

| | | | |
|---|---|---|---|
| 5,623,204 A | 4/1997 | Wilkerson | |
| 7,262,595 B2 | 8/2007 | Rudd, III | |
| 11,428,668 B2 | 8/2022 | Demers-Carpentier | |

| | | | | |
|---|---|---|---|---|
| 2003/0080736 A1* | 5/2003 | Batzinger | .......... | G01N 27/9046 |
| | | | | 324/238 |
| 2009/0115411 A1* | 5/2009 | Sun | .................... | G01N 27/9006 |
| | | | | 324/242 |
| 2009/0315540 A1* | 12/2009 | Goldfine | .............. | B24B 37/005 |
| | | | | 324/202 |

(Continued)

FOREIGN PATENT DOCUMENTS

| | | |
|---|---|---|
| FR | 2314496 A1 | 1/1977 |
| JP | 7295522 B2 | 6/2023 |

OTHER PUBLICATIONS

Digital Technologies Hub; https://www.digitaltechnologieshub.edu.au/media/tvspfznc/makey-makey-boards_conductive-and-non-conductive-materials.pdf; 2016 Education Services Australia Ltd, (Year: 2016).*

(Continued)

*Primary Examiner* — Nasima Monsur
(74) *Attorney, Agent, or Firm* — Getz Balich LLC

(57) ABSTRACT

An eddy current probe assembly includes an eddy current probe extending along a center axis between and to a probe end and a distal end. The eddy current probe includes a first drive coil, a second drive coil, a first differential sense coil, and a second differential sense coil. Each of the first drive coil, the second drive coil, the first differential sense coil, and the second differential sense coil is disposed at the probe end and the center axis. The first drive coil, the second drive coil, the first differential sense coil, and the second differential sense coil are arranged circumferentially about the center axis with the first drive coil disposed circumferentially between and circumferentially adjacent the first differential sense coil and the second differential sense coil and the second drive coil disposed circumferentially between and circumferentially adjacent the first differential sense coil and the second differential sense coil.

19 Claims, 6 Drawing Sheets

(56) References Cited

U.S. PATENT DOCUMENTS

| | | | |
|---|---|---|---|
| 2013/0106409 A1* | 5/2013 | Wang | G01R 33/028 |
| | | | 324/239 |
| 2015/0108970 A1* | 4/2015 | Kurokawa | G01N 27/904 |
| | | | 324/234 |
| 2019/0353618 A1* | 11/2019 | Jinno | G01N 27/904 |
| 2020/0088685 A1 | 3/2020 | Heuer | |
| 2021/0033565 A1* | 2/2021 | Demers-Carpentier | |
| | | | G01N 27/9006 |

OTHER PUBLICATIONS

EP Search Report for EP Patent Application No. 24206488.9 dated Mar. 12, 2025.

* cited by examiner

EDDY CURRENT PROBE ASSEMBLY

BACKGROUND

1. Technical Field

This disclosure relates generally to an eddy current probe assembly and, more particularly, to an orthogonal, in-plane eddy current probe.

2. Background Information

Components for machinery may be inspected for cracks, defects, and other structural failures using non-destructive inspection equipment. For example, metallic and other electrically-conductive components may be inspected for structural failures using an eddy current probe. Various types and configurations of eddy current probes are known in the art. While these known eddy current probes have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an eddy current probe assembly includes an eddy current probe extending along a center axis between and to a probe end and a distal end. The eddy current probe includes a first drive coil, a second drive coil, a first differential sense coil, and a second differential sense coil. Each of the first drive coil, the second drive coil, the first differential sense coil, and the second differential sense coil is disposed at the probe end and the center axis. The first drive coil, the second drive coil, the first differential sense coil, and the second differential sense coil are arranged circumferentially about the center axis with the first drive coil disposed circumferentially between and circumferentially adjacent the first differential sense coil and the second differential sense coil and the second drive coil disposed circumferentially between and circumferentially adjacent the first differential sense coil and the second differential sense coil.

In any of the aspects or embodiments described above and herein, each of the first drive coil and the second drive coil may have a first length. The first length may extend from the probe end to the distal end.

In any of the aspects or embodiments described above and herein, each of the first differential sense coil and the second differential sense coil may have a second length. The second length may be less than the first length.

In any of the aspects or embodiments described above and herein, the second length may be less than one quarter of the first length.

In any of the aspects or embodiments described above and herein, each of the first drive coil, the second drive coil, the first differential sense coil, and the second differential sense coil may include a first side, a second side, and an outer diameter side.

In any of the aspects or embodiments described above and herein, the first side may intersect the second side at the center axis.

In any of the aspects or embodiments described above and herein, the first side and the second side may be orthogonal.

In any of the aspects or embodiments described above and herein, the eddy current probe may further include a plurality of conductive cores. Each core of the plurality of conductive cores may be disposed within a respective one of the first drive coil, the second drive coil, the first differential sense coil, and the second differential sense coil.

In any of the aspects or embodiments described above and herein, each of the conductive cores may extend from the probe end to the distal end.

In any of the aspects or embodiments described above and herein, the eddy current probe assembly may further include a controller including a processor in communication with a non-transitory memory storing instructions, which instructions when executed by the processor, may cause the processor to measure a first output voltage of the first differential sense coil and a second output voltage of the second differential sense coil.

In any of the aspects or embodiments described above and herein, the instructions, when executed by the processor, may further cause the processor to direct a first electrical current flow through the first drive coil and a second electrical current flow through the second drive coil.

In any of the aspects or embodiments described above and herein, the first electrical current flow may have a first circumferential direction, the second electrical current flow may have a second circumferential direction, and the first circumferential direction may be opposite the second circumferential direction.

In any of the aspects or embodiments described above and herein, the eddy current probe may further include a first spacer body and a second spacer body. The first spacer body may extend from the first differential sense coil to the distal end. The second spacer body may extend from the second differential sense coil to the distal end.

According to another aspect of the present disclosure, an eddy current probe assembly includes an eddy current probe and a controller. The eddy current probe extends along a center axis between and to a probe end and a distal end. The eddy current probe includes a first drive coil, a second drive coil, a first differential sense coil, and a second differential sense coil. Each of the first drive coil, the second drive coil, the first differential sense coil, and the second differential sense coil is disposed at the probe end and the center axis. The controller includes a processor in communication with a non-transitory memory storing instructions, which instructions when executed by the processor, cause the processor to direct a first electrical current flow through the first drive coil and a second electrical current flow through the second drive coil and measure a first output voltage of the first differential sense coil and a second output voltage of the second differential sense coil.

In any of the aspects or embodiments described above and herein, each of the first drive coil, the second drive coil, the first differential sense coil, and the second differential sense coil may include a first side, a second side, and an outer diameter side.

In any of the aspects or embodiments described above and herein, the first side may intersect the second side at the center axis.

In any of the aspects or embodiments described above and herein, the first side of the first drive coil may be disposed at the first differential sense coil and the second side of the first drive coil may be disposed at the second differential sense coil.

According to another aspect of the present disclosure, an eddy current probe assembly includes an eddy current probe extending along a center axis between and to a probe end and a distal end. The eddy current probe has a probe outer diameter side extending circumferentially about the center axis. The probe outer diameter side extends between and to the probe end and the distal end. The eddy current probe includes a first drive coil, a second drive coil, a first differential sense coil, and a second differential sense coil. Each of the first drive coil, the second drive coil, the first differential sense coil, and the second differential sense coil includes a first side, a second side, and a coil outer diameter side. The first side intersects the second side at the center axis. The coil outer diameter side forms the probe outer diameter side.

In any of the aspects or embodiments described above and herein, each of the first drive coil and the second drive coil may have a first length. The first length may extend from the probe end to the distal end.

In any of the aspects or embodiments described above and herein, each of the first differential sense coil and the second differential sense coil may have a second length. The second length may be less than the first length.

The present disclosure, and all its aspects, embodiments and advantages associated therewith will become more readily apparent in view of the detailed description provided below, including the accompanying drawings.

DETAILED DESCRIPTION

The present disclosure is directed to an eddy current probe configured for identifying cracks in a metal or metal alloy component. The present disclosure provides particular utility for identifying subsurface component cracks in proximity to localized structural protrusions of the component.

Figures 1, 2:
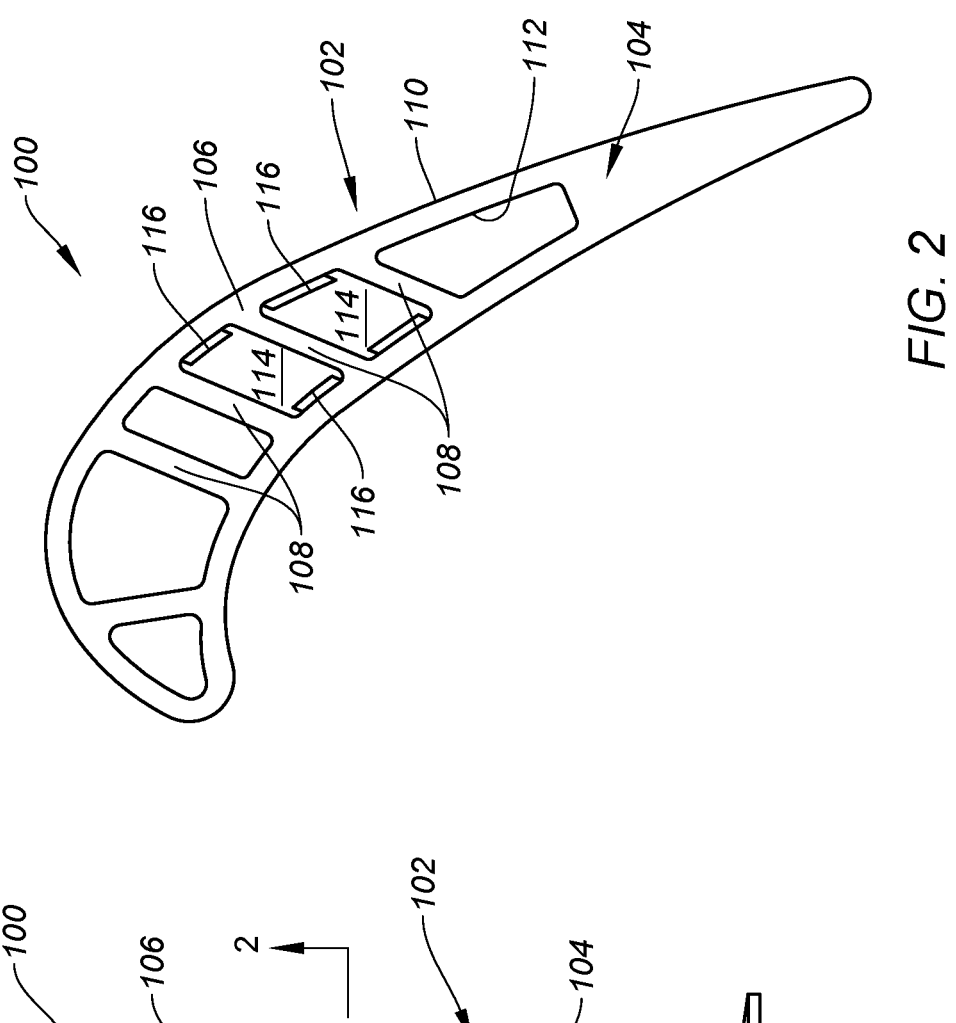
FIG. 1 illustrates a perspective view of an exemplary component, in accordance with one or more embodiments of the present disclosure.
FIG. 2 illustrates a cross-sectional view of the exemplary component of FIG. 1 taken along Line 2-2 of FIG. 1, in accordance with one or more embodiments of the present disclosure.

FIGS. 1-2 illustrate an exemplary configuration of a component 100 for which the present disclosure eddy current probe may be used to identify or otherwise detect cracks formed within a material of the component. The component 100 of FIGS. 1-2 is an airfoil 102 which may, for example, be configured for use as a rotor blade for an aircraft gas turbine engine turbine rotor. Alternatively, for example, the airfoil 102 may be configured for use as a fixed vane for an aircraft gas turbine engine turbine section. The present disclosure, however, is not limited to the foregoing exemplary configuration of the component 100, and the present disclosure eddy current probe may be used with any type or configuration of component 100 compatible with eddy current probe operation and detection.

The component 100 (e.g., the airfoil 102) of FIGS. 1-2 includes a component body 104. The component body 104 includes a body material. The body material may form all or a substantial portion of the component body 104. The body material may be a metal or metal alloy material configured to conduct an electrical current (e.g., an eddy current). For example, the body material may include a nickel-based alloy material. The component body 104 of FIG. 2 includes a perimeter wall 106 and a plurality of ribs 108. The perimeter wall 106 forms an exterior surface 110 of the component body 104 and an interior surface 112 of the component body 104. The ribs 108 extend between and connect opposing portions of the perimeter wall 106. The interior surface 112 and the ribs 108 form one or more passages 114 within component body 104. The passages 114 are configured to direct air or another cooling fluid through the component body 104 to provide cooling for the component body 104.

The component body 104 may additionally form one or more localized structural protrusions which deviate in shape and/or size from surrounding portions and surfaces of the component body 104. For example, the component body 104 of FIG. 2 includes a plurality of protrusions 116 along the passages 114. The protrusions 116 are configured to facilitate improved heat transfer (e.g., convective heat transfer) from the component body 104 to fluid flow within the passages 114. The protrusions 116 of FIG. 2 extend from the interior surface 112 into the passages 114. The protrusions 116 may additionally or alternatively extend from the ribs 108 into the passages 114. The protrusions 116 of FIG. 2 are configured as trip strips, however, the component body 104 may alternatively form other configurations of the protrusions 116 such as, but not limited to, pin fins, pedestals, and other protrusions forming heat transfer augmentation features.

Figure 3:
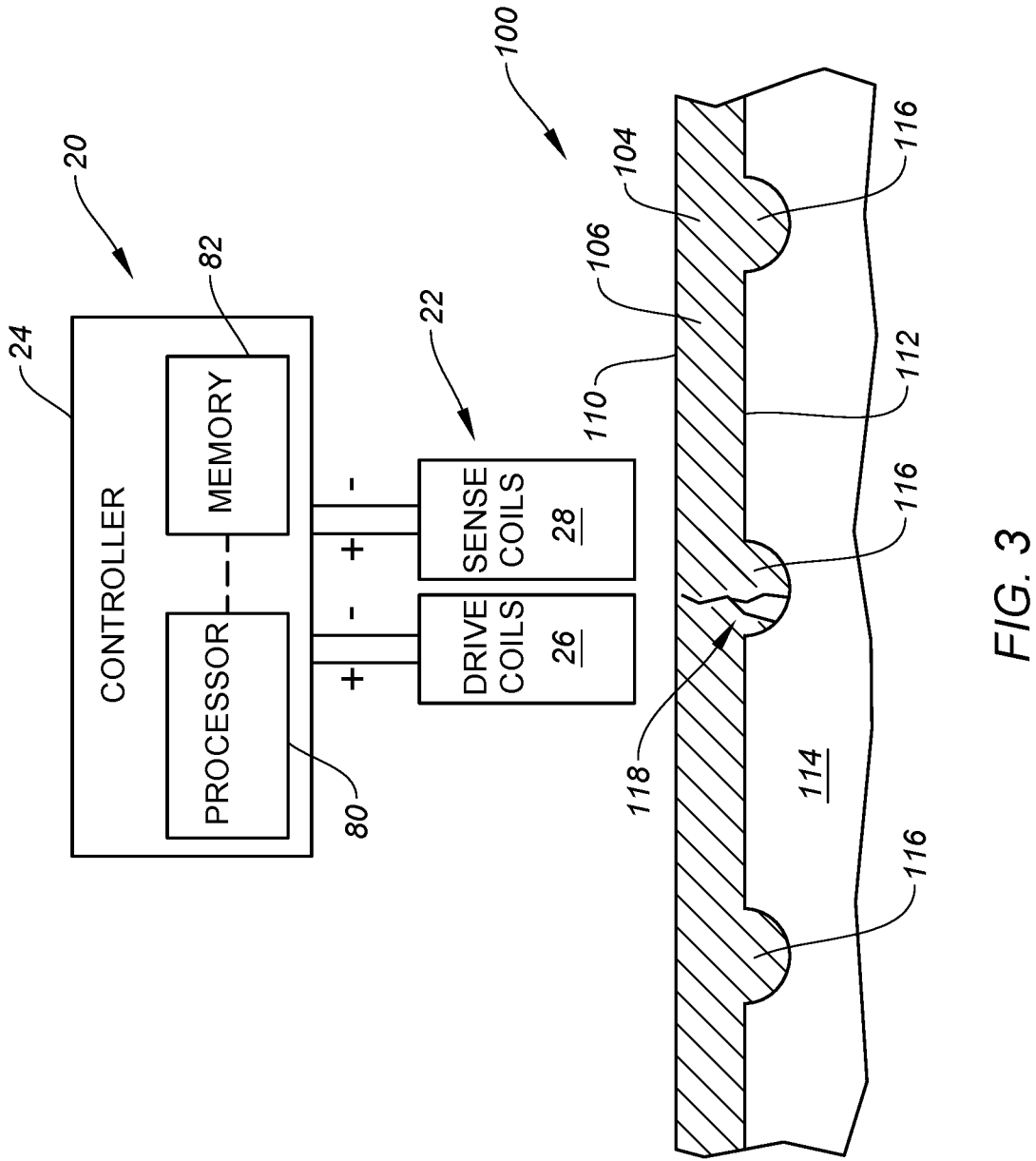
FIG. 3 schematically illustrates a portion of an exemplary component relative to an eddy current probe assembly, in accordance with one or more embodiments of the present disclosure.
Figure 5:
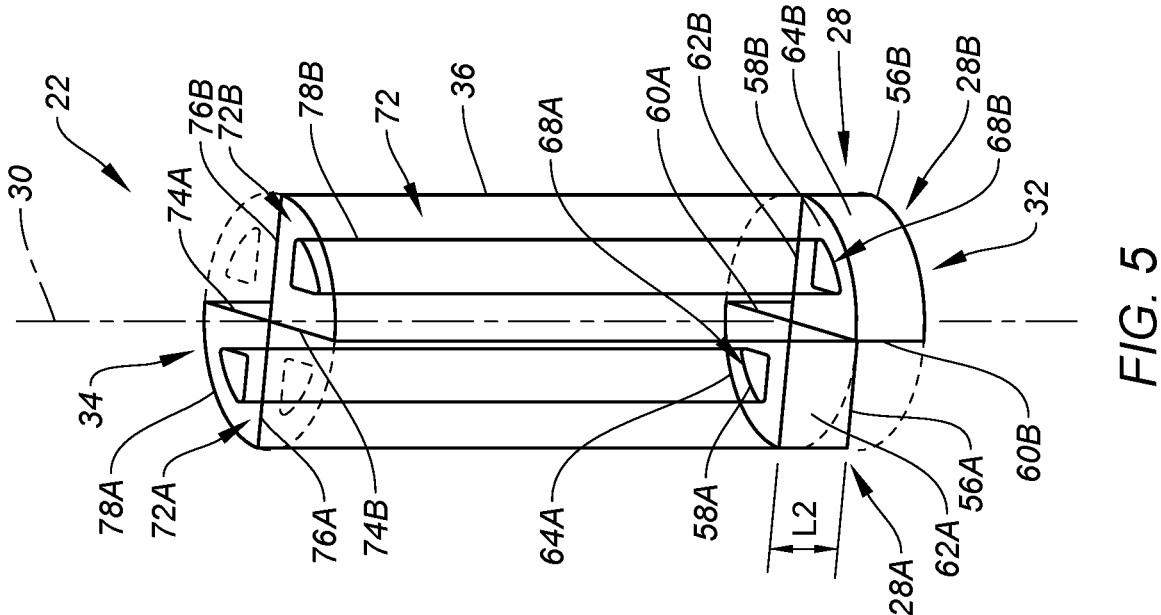
FIG. 5 illustrates a perspective view of other portions of the eddy current probe for the eddy current probe assembly of FIG. 3, in accordance with one or more embodiments of the present disclosure.
Figure 4:
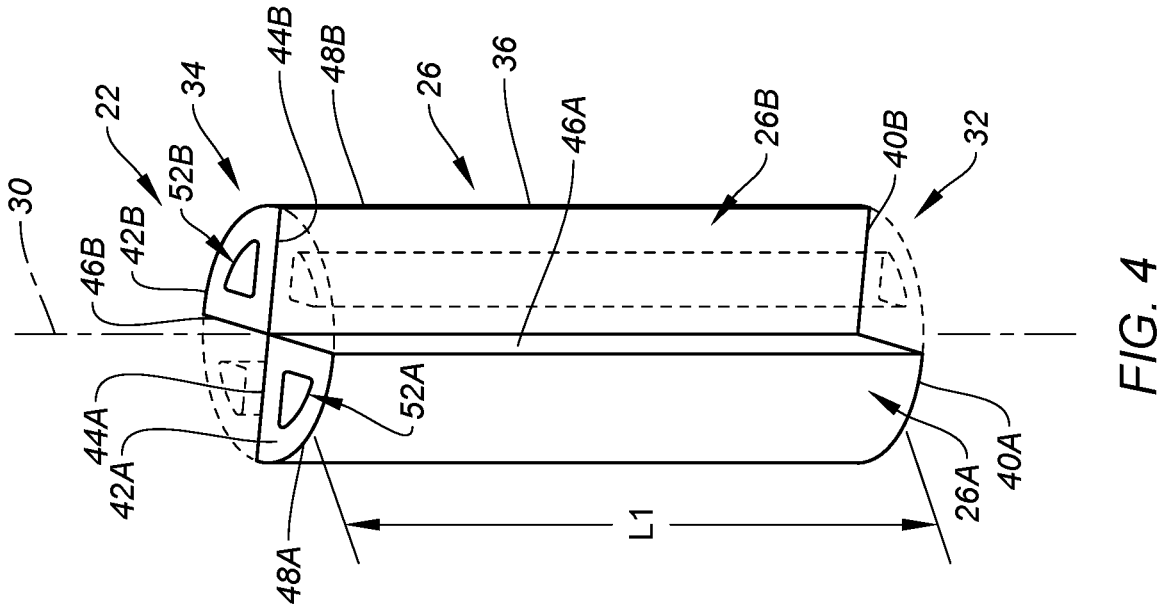
FIG. 4 illustrates a perspective view of portions of an eddy current probe for the eddy current probe assembly of FIG. 3, in accordance with one or more embodiments of the present disclosure.
Figure 6:
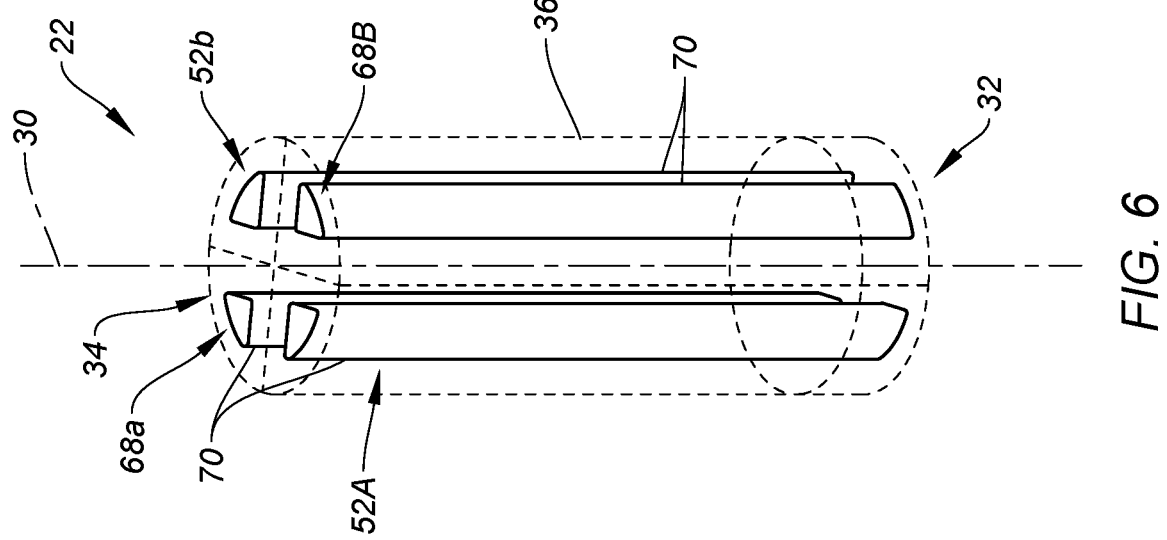
FIG. 6 illustrates a perspective view of other portions of the eddy current probe for the eddy current probe assembly of FIG. 3, in accordance with one or more embodiments of the present disclosure.

FIG. 3 illustrates a cutaway view of portion of the component body 104 including the perimeter wall 106 with the protrusions 116. The perimeter wall 106 and the protrusions 116 form a portion of one of the passages 114. The perimeter wall 106 of FIG. 3 includes a crack 118. The crack 118 is a subsurface crack which does not extend to or through the exterior surface 110 and, therefore, may not be observable from an exterior of the component 100 during inspection. The crack 118 of FIG. 3 is disposed at (e.g., on, adjacent, or proximate) one of the protrusions 116.

Eddy current probes may be used to identify a location of a crack or other defect within a component. However, at least some conventional eddy current probes of which we are aware may have difficulty distinguishing component crack from a localized structural protrusion (e.g., a trip strip or other protrusion) of the component. Accordingly, where a crack is disposed in proximity to a localized structural protrusion, an inspection of the component using these conventional eddy current probes may fail to identify or otherwise detect the crack.

FIG. 3 further illustrates a schematic view of an eddy current probe assembly 20 of the present disclosure. The eddy current probe assembly 20 includes an eddy current probe 22 and a controller 24. The eddy current probe 22 of FIG. 3 includes a pair of drive coils 26 and a pair of differential sense coils 28. The pair of drive coils 26 and the pair of differential sense coils 28 are electrically connected to the controller 24, as will be discussed in further detail. The eddy current probe assembly 20 of FIG. 1 includes a single eddy current probe 22, however, the eddy current probe assembly 20 may alternatively include an array of (e.g., a plurality of) eddy current probes 22 arranged together along a common plane.

FIGS. 4-7 illustrate views of the eddy current probe 22 including the pair of drive coils 26 and the pair of differential sense coils 28. The eddy current probe 22 extends along a center axis 30 between and to a probe end 32 of the eddy current probe 22 and a distal end 34 of the eddy current probe 22. The eddy current probe 22 includes an outer diameter side 36. The outer diameter side 36 extends about (e.g., completely around) the center axis 30. For example, the outer diameter side 36 may extend circumferentially about the center axis 30. The pair of drive coils 26 includes a first drive coil 26A and a second drive coil 26B. The pair of differential sense coils 28 includes a first differential sense coil 28A and a second differential sense coil 28B. Each of the first drive coil 26A, the second drive coil 26B, the first differential sense coil 28A, and the second differential sense coil 28B is disposed at (e.g., on, adjacent, or proximate) the probe end 32 and the center axis 30 to form an arrangement of orthogonal, in-plane coils at the probe end 32. The first drive coil 26A, the second drive coil 26B, the first differential sense coil 28A, and the second differential sense coil 28B are arranged circumferentially about the center axis 30. For example, the first drive coil 26A is disposed circumferentially between and circumferentially adjacent the first differential sense coil 28A and the second differential sense coil 28B. The second drive coil 26B is disposed circumferentially between and circumferentially adjacent the first differential sense coil 28A and the second differential sense coil 28B, and circumferentially opposite the first drive coil 26A. The first drive coil 26A, the second drive coil 26B, the first differential sense coil 28A, and the second differential sense coil 28B form the outer diameter side 36.

The first drive coil 26A extends along an axis 38A between and to a first end 40A and a second end 42A. The axis 38A may be parallel to or substantially parallel to the center axis 30. The first end 40A may be disposed at (e.g., on, adjacent, or proximate) the probe end 32. The second end 42A may be disposed at (e.g., on, adjacent, or proximate) the distal end 34. The first drive coil 26A has a length L1 extending between and to the first end 40A and the second end 42A. The first drive coil 26A includes a first side 44A, a second side 46A, and an outer diameter side 48A. The first side 44A, the second side 46A, and the outer diameter side 48A extend between and to the first end 40A and the second end 42A. The first side 44A intersects the second side 46A at (e.g., on, adjacent, or proximate) the center axis 30. The first side 44A and the second side 46A may be orthogonal or substantially orthogonal. The first side 44A is disposed at (e.g., on, adjacent, or proximate) the first differential sense coil 28A. The second side 46A is disposed at (e.g., on, adjacent, or proximate) the second differential sense coil 28B. The outer diameter side 48A extends between and connects the first side 44A and the second side 46A. The outer diameter side 48A forms a portion (e.g., a circumferential portion) of the outer diameter side 36. The first drive coil 26A is formed by a conductive winding assembly 50A. The conductive winding assembly 50A includes one or more conductive wires (e.g., insulated copper wires) wound about the axis 38A to form the first side 44A, the second side 46A, and the outer diameter side 48A from the first end 40A to the second end 42A. The conductive winding assembly 50A may further form a center passage 52A of the first drive coil 26A. The center passage 52A may extend along (e.g., coincident with) the axis 38A between and to the first end 40A and the second end 42A. The conductive winding assembly 50A is electrically connected with the controller 24 (see FIG. 3).

The second drive coil 26B extends along an axis 38B between and to a first end 40B and a second end 42B. The axis 38B may be parallel to or substantially parallel to the center axis 30. The first end 40B may be disposed at (e.g., on, adjacent, or proximate) the probe end 32. The second end 42B may be disposed at (e.g., on, adjacent, or proximate) the distal end 34. The second drive coil 26B has the length L1 extending between and to the first end 40B and the second end 42B. The second drive coil 26B includes a first side 44B, a second side 46B, and an outer diameter side 48B. The first side 44B, the second side 46B, and the outer diameter side 48B extend between and to the first end 40B and the second end 42B. The first side 44B intersects the second side 46B at (e.g., on, adjacent, or proximate) the center axis 30. The first side 44B and the second side 46B may be orthogonal or substantially orthogonal. The first side 44B is disposed at (e.g., on, adjacent, or proximate) the second differential sense coil 28B. The second side 46B is disposed at (e.g., on, adjacent, or proximate) the first differential sense coil 28A. The outer diameter side 48B extends between and connects the first side 44B and the second side 46B. The outer diameter side 48B forms a portion (e.g., a circumferential portion) of the outer diameter side 36. The second drive coil 26B is formed by a conductive winding assembly 50B. The conductive winding assembly 50B includes one or more conductive wires (e.g., insulated copper wires) wound about the axis 38B to form the first side 44B, the second side 46B, and the outer diameter side 48B from the first end 40B to the second end 42B. The conductive winding assembly 50B may further form a center passage 52B of the second drive coil 26B. The center passage 52B may extend along (e.g., coincident with) the axis 38B between and to the first end 40B and the second end 42B. The conductive winding assembly 50B is electrically connected with the controller 24 (see FIG. 3).

The first differential sense coil 28A extends along an axis 54A between and to a first end 56A and a second end 58A. The axis 54A may be parallel to or substantially parallel to the center axis 30. The first end 56A may be disposed at (e.g., on, adjacent, or proximate) the probe end 32. The second end 42A may be disposed between the first end 56A and the second end 58A. The first differential sense coil 28A has a length L2 extending between and to the first end 56A and the second end 58A. The length L2 may be less than the length L1. For example, the length L2 may be less than one quarter of the length L1. The first differential sense coil 28A includes a first side 60A, a second side 62A, and an outer diameter side 64A. The first side 60A, the second side 62A, and the outer diameter side 64A extend between and to the first end 56A and the second end 58A. The first side 60A intersects the second side 62A at (e.g., on, adjacent, or proximate) the center axis 30. The first side 60A and the second side 62A may be orthogonal or substantially orthogonal. The first side 60A is disposed at (e.g., on, adjacent, or proximate) the second drive coil 26B. The second side 62A is disposed at (e.g., on, adjacent, or proximate) the first drive coil 26A. The outer diameter side 64A extends between and connects the first side 60A and the second side 62A. The outer diameter side 64A forms a portion (e.g., a circumferential portion) of the outer diameter side 36. The first differential sense coil 28A is formed by a conductive winding assembly 66A. The conductive winding assembly 66A includes one or more conductive wires (e.g., insulated copper wires) wound about the axis 54A to form the first side 60A, the second side 62A, and the outer diameter side 64A from the first end 56A to the second end 58A. The conductive winding assembly 66A may further form a center passage 68A of the first differential sense coil 28A. The center passage 68A may extend along (e.g., coincident with) the axis 54A between and to the first end 56A and the second end 58A. The conductive winding assembly 66A is electrically connected with the controller 24 (see FIG. 3).

The second differential sense coil 28B extends along an axis 54B between and to a first end 56B and a second end 58B. The axis 54B may be parallel to or substantially parallel to the center axis 30. The first end 56B may be disposed at (e.g., on, adjacent, or proximate) the probe end 32. The second end 42B may be disposed between the first end 56B and the second end 58B. The second differential sense coil 28B has the length L2 extending between and to the first end 56B and the second end 58B. The second differential sense coil 28B includes a first side 60B, a second side 62B, and an outer diameter side 64B. The first side 60B, the second side 62B, and the outer diameter side 64B extend between and to the first end 56B and the second end 58B. The first side 60B intersects the second side 62B at (e.g., on, adjacent, or proximate) the center axis 30. The first side 60B and the second side 62B may be orthogonal or substantially orthogonal. The first side 60B is disposed at (e.g., on, adjacent, or proximate) the first drive coil 26A. The second side 62A is disposed at (e.g., on, adjacent, or proximate) the second drive coil 26B. The outer diameter side 64B extends between and connects the first side 60B and the second side 62B. The outer diameter side 64B forms a portion (e.g., a circumferential portion) of the outer diameter side 36. The second differential sense coil 28B is formed by a conductive winding assembly 66B. The conductive winding assembly 66B includes one or more conductive wires (e.g., insulated copper wires) wound about the axis 54B to form the first side 60B, the second side 62B, and the outer diameter side 64B from the first end 56B to the second end 58B. The conductive winding assembly 66B may further form a center passage 68B of the second differential sense coil 28B. The center passage 68B may extend along (e.g., coincident with) the axis 54B between and to the first end 56B and the second end 58B. The conductive winding assembly 66A is electrically connected with the controller 24 (see FIG. 3).

The eddy current probe 22 may further include a plurality of conductive cores 70. Each of the conductive cores 70 may be disposed within a respective one of the center passages 52A, 52B, 68A, 68B. Each of the conductive cores 70 may extend between and to the probe end 32 and the distal end 34. The conductive cores 70 may be formed, wholly or in substantial part, by a ferromagnetic metal or metal alloy (e.g., iron or iron alloy) or a ferrimagnetic compound.

The eddy current probe 22 may further include a pair of spacer bodies 72. The pair of spacer bodies 72 may include a first spacer body 72A and a second spacer body 72B.

The first spacer body 72A may extend between and to the first differential sense coil 28A (e.g., the second end 58A) and the distal end 34 along the axis 54A. Similar to the first differential sense coil 28A, the first spacer body 72A may include a first side 74A, a second side 76A, and an outer diameter side 78A. The first side 74A intersects the second side 76A at (e.g., on, adjacent, or proximate) the center axis 30. The first side 74A and the second side 76A may be orthogonal or substantially orthogonal. The first side 74A is disposed at (e.g., on, adjacent, or proximate) the second drive coil 26B. The second side 76A is disposed at (e.g., on, adjacent, or proximate) the first drive coil 26A. The outer diameter side 78A extends between and connects the first side 74A and the second side 76A. The outer diameter side 78A forms a portion (e.g., a circumferential portion) of the outer diameter side 36. The first spacer body 72A may further form the center passage 68A between and to the first differential sense coil 28A (e.g., the second end 58A) and the distal end 34 along the axis 54A. The first spacer body 72A may be formed, wholly or in substantial part, by a non-conductive material.

The second spacer body 72B may extend between and to the second differential sense coil 28B (e.g., the second end 58B) and the distal end 34 along the axis 54B. Similar to the second differential sense coil 28B, the second spacer body 72B may include a first side 74B, a second side 76B, and an outer diameter side 78B. The first side 74B intersects the second side 76B at (e.g., on, adjacent, or proximate) the center axis 30. The first side 74B and the second side 76B may be orthogonal or substantially orthogonal. The first side 74B is disposed at (e.g., on, adjacent, or proximate) the first drive coil 26A. The second side 76B is disposed at (e.g., on, adjacent, or proximate) the second drive coil 26B. The outer diameter side 78B extends between and connects the first side 74B and the second side 76B. The outer diameter side 78B forms a portion (e.g., a circumferential portion) of the outer diameter side 36. The second spacer body 72B may further form the center passage 68B between and to the second differential sense coil 28B (e.g., the second end 58B) and the distal end 34 along the axis 54B. The second spacer body 72B may be formed, wholly or in substantial part, by a non-conductive material.

The controller 24 includes a processor 80 connected in signal communication with memory 82. The processor 80 may include any type of computing device, computational circuit, processor(s), CPU, computer, or the like capable of executing a series of instructions that are stored in the memory 82. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the eddy current probe assembly 20 to accomplish the same algorithmically and/or by coordination of eddy current probe assembly 20 components. The memory 82 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 24. The controller 24 may include, or may be in communication with, an input device that enables a user to enter data and/or instructions, and may include, or be in communication with, an output device configured, for example to display information (e.g., a visual display), or to transfer data, etc. A person of skill in the art will recognize that portions of the controller 24 may assume various forms (e.g., digital signal processor, analog device, etc.) capable of performing the functions described herein.

Figure 7:
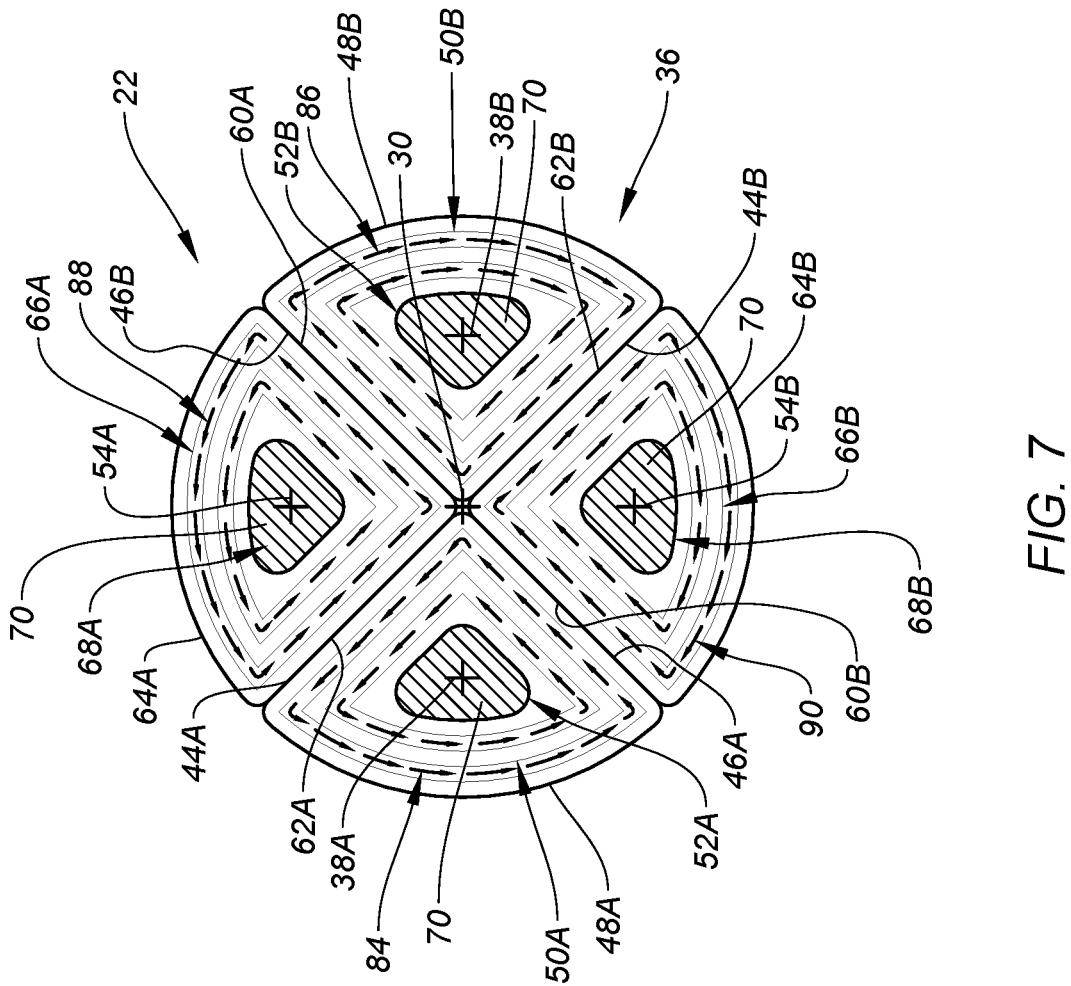
FIG. 7 schematically illustrates an axial view of a probe end of the eddy current probe of FIGS. 4-6, in accordance with one or more embodiments of the present disclosure.

In operation, the probe end 32 of the eddy current probe 22 may be positioned at (e.g., on, adjacent, or proximate) the component 100 (e.g., the exterior surface 110) as shown, for example, in FIG. 3. The controller 24 controls and directs electrical current (e.g., an alternating current (AC)) through the pair of drive coils 26 causing the first drive coil 26A (e.g., the conductive winding assembly 50A) and the second drive coil 26B (e.g., the conductive winding assembly 50B) to form a moving and/or changing magnetic field (hereinafter an "incident magnetic field"). As shown in FIG. 7, the controller 24 may direct electrical current through the first drive coil 26A (illustrated in FIG. 7 as electrical current flow 84) in a first circumferential direction opposite a second circumferential direction in which the controller 24 directs electrical current through the second drive coil 26B (illustrated in FIG. 7 as electrical current flow 86). For example, as shown in FIG. 7, the electrical current flow 84 is in a counter-clockwise direction relative to the axis 54A whereas the electrical current flow 86 is in a clockwise direction relative to the axis 54B. The present disclosure, however, is not limited to any particular electrical current flow direction for the pair of drive coils 26.

Exposure of the electrically-conductive component body 104 (e.g., the perimeter wall 106) to the incident magnetic field generates eddy currents within the component body 104. The greater length L1 of the pair of drive coils 26 (e.g., relative to the pair of differential sense coils 28) may facilitate greater incident magnetic field strength and, therefore, a greater magnitude of eddy current flow. These eddy currents within the component body 104 generate a second magnetic field (hereinafter an "induced magnetic field") in opposition to the incident magnetic field. Within the component body 104, the flow of the eddy currents may be altered or disrupted by the presence of cracks or other defects in the component body 104 material and by localized structural protrusions (e.g., the protrusions 116) of the component body 104, thereby forming perturbations in the induced magnetic field. The presence of the pair of differential sense coils 28 within the induced magnetic field induces an electrical current flow 88 within the first differential sense coil 28A (e.g., the conductive winding assembly 66A) and an electrical current flow 90 within the second differential sense coil 28B (e.g., the conductive winding assembly 66B). The compact configuration of the pair of differential sense coils 28 (e.g., the length L2 less than the length L1) facilitates interaction between the pair of differential sense coils 28 (e.g., all or a substantial portion of the pair of differential sense coils 28) and the induced magnetic field.

Figure 8B:
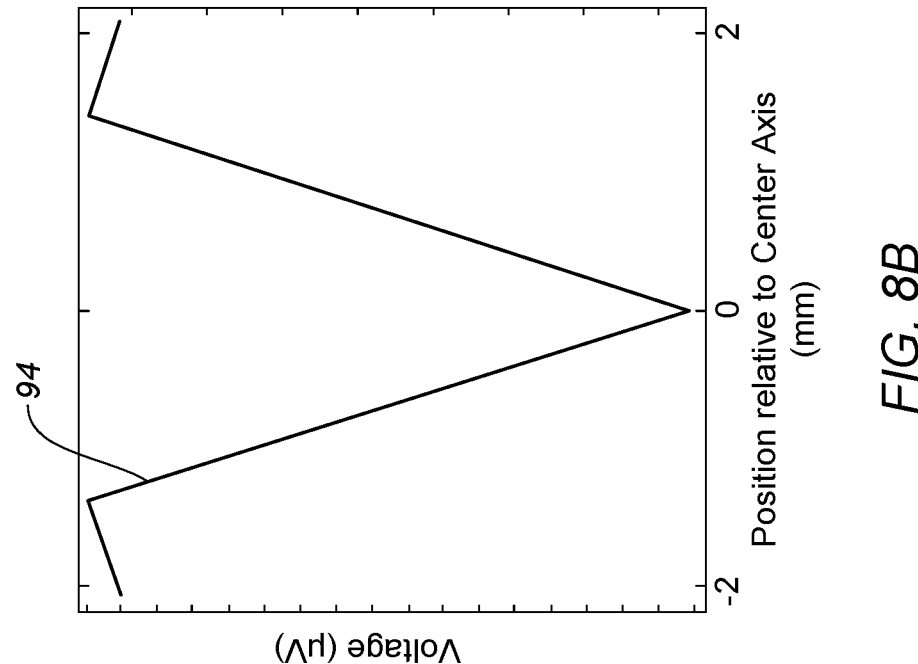
FIGS. 8A-B illustrate a graph of an output voltage signal vs. component position for a localized structural protrusion of the component of FIGS. 1-2 and a crack of the component of FIGS. 1-2, respectively, in accordance with one or more embodiments of the present disclosure.
Figure 8A:
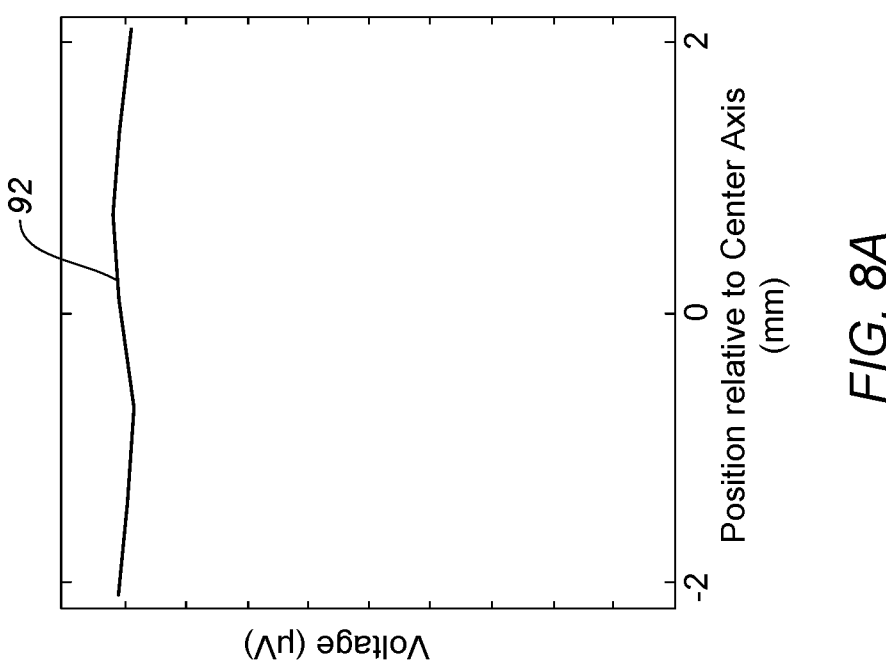

The controller 24 is electrically connected to the conductive winding assembly 66A and the conductive winding assembly 66B. The controller is configured to measure a first output voltage across the conductive winding assembly 66A and a second output voltage across the conductive winding assembly 66B. Using the first output voltage and the second output voltage, the controller 24 may determine an output voltage signal. The output voltage signal may be used to identify the presence or absence of cracks (e.g., subsurface cracks) or other defects of the component body 104 or the presence or absence of localized structural protrusions (e.g., the protrusions 116) of the component body 104. In particular, the present disclosure eddy current probe assembly 20 generates a significantly greater output voltage signal response for cracks in comparison to localized structural protrusions. For example, FIG. 8A illustrates an exemplary output voltage signal 92 (e.g., real voltage signal) of the eddy current probe 22 relative to a position of one of the protrusions 116 of the component body 104. FIG. 8B illustrates an exemplary output voltage signal 94 (e.g., real voltage signal) of the eddy current probe 22 relative to a position of the crack 118 (e.g., a subsurface crack) of the component body 104. As can be understood from FIGS. 8A-B, the variation in the output voltage signal 94 for the crack 118 is significantly greater than the output voltage signal 92 for the protrusion 116. Accordingly, the present disclosure eddy current probe assembly 20 may facilitate improved differentiation between cracks and localized structural protrusions of a component body 104.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. An eddy current probe assembly comprising:
an eddy current probe extending along a center axis between and to a probe end and a distal end, the eddy current probe includes a first drive coil, a second drive coil, a first differential sense coil, and a second differential sense coil, each of the first drive coil, the second drive coil, the first differential sense coil, and the second differential sense coil is disposed at the probe end and the center axis, and the first drive coil, the second drive coil, the first differential sense coil, and the second differential sense coil are arranged circumferentially about the center axis with the first drive coil disposed circumferentially between and circumferentially adjacent the first differential sense coil and the second differential sense coil and the second drive coil disposed circumferentially between and circumferentially adjacent the first differential sense coil and the second differential sense coil;
wherein the eddy current probe further includes a first spacer body and a second spacer body, the first spacer body extends from the first differential sense coil to the distal end, and the second spacer body extends from the second differential sense coil to the distal end; and wherein the first spacer body and the second spacer body are formed, wholly or in substantial part, by a non-conductive material.

2. The eddy current probe assembly of claim 1, wherein each of the first drive coil and the second drive coil has a first length, and the first length extends from the probe end to the distal end.

3. The eddy current probe assembly of claim 2, wherein each of the first differential sense coil and the second differential sense coil has a second length, and the second length is less than the first length.

4. The eddy current probe assembly of claim 3, wherein the second length is less than one quarter of the first length.

5. The eddy current probe assembly of claim 1, wherein each of the first drive coil, the second drive coil, the first differential sense coil, and the second differential sense coil includes a first side, a second side, and an outer diameter side.

6. The eddy current probe assembly of claim 5, wherein the first side intersects the second side at the center axis.

7. The eddy current probe assembly of claim 5, wherein the first side and the second side are orthogonal.

8. The eddy current probe assembly of claim 1, wherein the eddy current probe further includes a plurality of conductive cores, and each core of the plurality of conductive cores is disposed within a respective one of the first drive coil, the second drive coil, the first differential sense coil, and the second differential sense coil.

9. The eddy current probe assembly of claim 8, wherein each of the conductive cores extends from the probe end to the distal end.

10. The eddy current probe assembly of claim 1, further comprising a controller including a processor in communication with a non-transitory memory storing instructions, which instructions when executed by the processor, cause the processor to:
measure a first output voltage of the first differential sense coil and a second output voltage of the second differential sense coil.

11. The eddy current probe assembly of claim 10, wherein the instructions, when executed by the processor, further cause the processor to direct a first electrical current flow through the first drive coil and a second electrical current flow through the second drive coil.

12. The eddy current probe assembly of claim 11, wherein the first electrical current flow has a first circumferential direction, the second electrical current flow has a second circumferential direction, and the first circumferential direction is opposite the second circumferential direction.

13. An eddy current probe assembly comprising:
an eddy current probe extending along a center axis between and to a probe end and a distal end, the eddy current probe includes a first drive coil, a second drive coil, a first differential sense coil, and a second differential sense coil, and each of the first drive coil, the second drive coil, the first differential sense coil, and the second differential sense coil is disposed at the probe end and the center axis; and
a controller including a processor in communication with a non-transitory memory storing instructions, which instructions when executed by the processor, cause the processor to:
direct a first electrical current flow through the first drive coil and a second electrical current flow through the second drive coil; and measure a first output voltage of the first differential sense coil and a second output voltage of the second differential sense coil;

wherein the eddy current probe further includes a first spacer body and a second spacer body, the first spacer body extends from the first differential sense coil to the distal end, and the second spacer body extends from the second differential sense coil to the distal end; and wherein the first spacer body and the second spacer body are formed, wholly or in substantial part, by a non-conductive material.

14. The eddy current probe assembly of claim 13, wherein each of the first drive coil, the second drive coil, the first differential sense coil, and the second differential sense coil includes a first side, a second side, and an outer diameter side.

15. The eddy current probe assembly of claim 14, wherein the first side intersects the second side at the center axis.

16. The eddy current probe assembly of claim 14, wherein the first side of the first drive coil is disposed at the first differential sense coil and the second side of the first drive coil is disposed at the second differential sense coil.

17. An eddy current probe assembly comprising:

an eddy current probe extending along a center axis between and to a probe end and a distal end, the eddy current probe has a probe outer diameter side extending circumferentially about the center axis, the probe outer diameter side extends between and to the probe end and the distal end, the eddy current probe includes a first drive coil, a second drive coil, a first differential sense coil, and a second differential sense coil, each of the first drive coil, the second drive coil, the first differential sense coil, and the second differential sense coil includes a first side, a second side, and a coil outer diameter side, the first side intersects the second side at the center axis, and the coil outer diameter side forms the probe outer diameter side, wherein the eddy current probe further includes a first spacer body and a second spacer body, the first spacer body extends from the first differential sense coil to the distal end, and the second spacer body extends from the second differential sense coil to the distal end; and wherein the first spacer body and the second spacer body are formed, wholly or in substantial part, by a non-conductive material.

18. The eddy current probe assembly of claim 17, wherein each of the first drive coil and the second drive coil has a first length, and the first length extends from the probe end to the distal end.

19. The eddy current probe assembly of claim 18, wherein each of the first differential sense coil and the second differential sense coil has a second length, and the second length is less than the first length.

* * * * *